United States Patent Office 3,432,560
Patented Mar. 11, 1969

3,432,560
METHOD FOR PREPARATION OF ALKANEDIOLS
Alfred W. Martin, James W. Walker, William T. McNair, Jr., and Coy H. Hood, Corpus Christi, Tex., assignors to Celanese Corporation of America, New York, N.Y., a corporation of Delaware
No Drawing. Filed Sept. 23, 1965, Ser. No. 489,738
U.S. Cl. 260—635                8 Claims
Int. Cl. C07c 31/18, 69/66

ABSTRACT OF THE DISCLOSURE

In a process for producing 1,6-hexanediol by hydrogenating a feedstock comprising esters of an acid mixture comprising adipic acid and hydroxycaproic acid obtained by the partial oxidation of cyclohexane, an ester feedstock having a very low free acid content is obtained by (a) adding to said acid mixture at least a stoichiometrically equivalent quantity of a terminal alkanediol having 4 to 8 carbon atoms; (b) subjecting the resulting mixture of acids and alkanediol to a concentration step wherein the mixture is heated, the bulk of any water present is removed as a vapor, and a partial esterification of the acids with the alkanediol takes place; and (c) passing the product of the concentration step through a series of heated reaction zones which are operated under vacuum and in which the esterification of the acids with the alkanediol is completed. From the heated reaction zones there is withdrawn a vapor comprising water of reaction and organic materials which are more volatile than the alkanediol. The vapor withdrawn from each zone is not allowed to pass subsequently through the liquid contained in any other zone.

---

This invention relates to a method of preparing an organic feedstock for catalytic reduction. More particularly, this invention relates to a method of preparing an organic feedstock comprising the carboxylic acids obtained from the liquid phase oxidation of cyclohexane for catalytic hydrogenation to produce 1,6-hexanediol used in the production of hexamethylenediamine, a valuable nylon intermediate.

It is known that the liquid phase oxidation of cyclohexane with molecular oxygen in the presence of a cobalt, chromium or manganese catalyst under controlled conditions results in a mixture of products including cyclohexanol, cyclohexanone, adipic acid, glutaric acid, succinic acid, hydroxycaproic acid, caprolactone and formylvaleric acid. For purposes of this invention the carboxylic acid products of cyclohexane oxidation (adipic acid, glutaric acid, succinic acid, hydroxycaproic acid, and formylvaleric acid) will be referred to as COP acids. The COP acids are processed in accordance with this invention to produce a feed material suitable for introduction into a hydrogenation reactor for the subsequent production of polyhydric alcohols such as 1,6-hexanediol, 1,5-pentanediol and 1,4-butanediol. It is necessary to reduce the free acid content of the COP acid mixture to a very low level, preferably less than 0.1 percent by weight in order to catalytically reduce the feed mixtures by hydrogenation with, for example, a hydrogenation catalyst such as copper chromite. The presence of free acid in the feed mixture severly deactivates hydrogenation catalysts such as copper chromite. In addition other unknown catalyst poisons boiling at a temperature below that of the terminal alkane diol used in the process at the particular pressure of the system must be removed for the effective operation of the hydrogenation process.

It is an object of this invention to provide a process which reduces the free acid content of the COP acid feed mixture to a low level in a continuous economic manner and at the same time removes other unknown organic fractions in the feed mixture which deactive hydrogenation catalysts.

It is a further object of this invention to avoid deactivation of such hydrogenation catalysts as copper chromite in the production of polyhydric alcohols such as 1,6-hexanediol.

Still a further object is to provide a simple and inexpensive process for producing a product for reduction with hydrogen in the presence of a copper chromite catalyst to produce 1,6-hexanediol used in the manufacture of hexamethylenediamine.

This invention is carried out by mixing the COP acids obtained from the oxidation of cyclohexane together with an excess, generally 10 to 70%, of a terminal alkalnediol having from 4 to 8 carbon atoms, heating the mixture to reflux temperature while withdrawing a vapor comprising water and an organic fraction boiling below that of the terminal alkanediol employed, passing said liquid mixture through an esterification reactor having consecutive, heated, baffled reaction zones whereby back-mixing of the liquid mixture is substantially eliminated, maintaining said reactor at a temperature ranging from about 200 to 300° C. and a pressure ranging from about 50 to 760 mm. Hg A., continuously withdrawing from the reaction zone the reaction vapors and an organic fraction boiling below the boiling point of a terminal alkanediol having from 4 to 8 carbon atoms without passing said vapors and organic fractions through the liquid mixture contained in any other reaction zone, and withdrawing an esterified product as a liquid stream having an acid composition of less than 0.3 wt. percent at a rate providing a residence time of from about 2 to 6 hours.

The subsequent hydrogenation of the COP acid esters to their corresponding polyhydric alcohols is advantageously carried out by feeding the COP acid esters together with hydrogen into a reactor maintained at about 200 to 300° C. and 1,000 to 12,000 p.s.i.g., preferably 250 to 290° C. and 3,700 to 5,000 p.s.i.g. The hydrogenation catalyst used is preferably a copper chromite catalyst although barium stabilized copper chromite, Raney copper and barium oxide promoted copper chromite have been found well suited to the process. The catalyst may be supported by an inert carrier such as pumice or inactive silica. The hydogenation reaction can be carried out in either a fixed, flooded, slurry or trickle catalyst bed.

Only those alkanediols which do not require the use of an esterification catalyst and whose esters can be converted by catalytic hydrogenation at relatively high yields are applicable in the process according to this invention. Examples of such alkanediols which can be used include those having from 4 to 8 carbon atoms such as 1,6-hexanediol, 1,5-pentanediol, and 1,4-butanediol. The preferred diol is 1,6-hexanediol.

Monohydric alcohols such as methanol and ethanol cannot be used in the process according to this invention as they require the use of a catalyst to effect complete esterification of the COP acids. Any homogeneous strong acid catalyst such as sulfuric acid or para-toluene sulfonic acid, both conventional esterification catalysts, would have to be removed from the esters prior to hydrogenation as they attack the hydrogenation catalyst rendering it inactive. Diols such as ethylene glycol or propylene glycol cannot be used. Ethylene glycol undergoes thermal degradation at temperatures as low as 150° C. At the temperature at which the esterification reactor is operated (greater than 200° C.), one of the degradation products formed, water, hydrolyzes the COP esters and the resulting acid causes deactivation of the hydrogenation catalyst. Thermal degradation of higher alkanediols such as 1,6-hexanediol, on the other hand, is nil at temperatures below 285° C. Also, the hydrogenation of 1,6-hexanediol esters proceeds with much more ease and in a shorter period of time than hydrogenation of the corresponding ethylene glycol esters. The process of this invention has an advantage in that it requires only a single heating of the COP acids with an excess of the 4 to 8 carbon terminal alkanediols without the addition of an esterification catalyst and without the addition of entrainers such as water, inert gases, or liquid organic substances.

The COP acid-diol mixture is preheated to reflux temperature in a suitable concentrator vessel before entry into the esterification reactor. Generally the reflux temperature ranges from about 140 to 220° C. and the pressure ranges from about 200 mm. Hg A. to atmospheric pressure, preferably atmospheric pressure. Some pre-esterification occurs and the bulk of the water present in the feed mixture is removed in the concentrator. During the preheating operation water present in the COP acid feed mixture, water formed as a result of the partial esterification and an organic fraction boiling below the boiling point of the terminal alkanediol being used are removed. Generally temperatures in the range of 60 to 220° C. at atmospheric pressure are sufficient to remove this organic fraction. The composition of the organic fraction in the 60 to 220° C. boiling range is not known; however, it is essential that this fraction be removed for these volatile constituents act as catalyst poisons for hydrogenation catalysts and greatly lower the overall economy and efficiency of the process. One or more concentrator vessels may be employed depending on the particular COP feedstock used.

The partially esterified feed mixture still containing an excess of diol passes from the concentrator to the esterification reactor where the free acid content of the feed is reduced to a very low level, preferably less than 0.1 percent. The esterification reactor consists of several stages, for example, about 5 and preferably from 20 to 30 stages, with a common vacuum source for all stages. The stages may be packing or baffles in a horizontal reactor or cascading baffles in a vertical reactor. The baffles in the reactor prevent any substantial backmixing of the liquid feed material. Heat input surface must be available through all stages since heat of reaction and vaporization providing agitation is required for all stages. The heat, for example, may be supplied by such means as an electrical wrap around an outer jacket surrounding the reactor through which hot oil is circulated, or by condensing Dowtherm vapor in the outer jacket.

A means for removing the water formed by the reaction of the COP acids with the particular alkanediol and removing the organic fraction boiling below the boiling point of the esterifying alkanediol, generally between 50 and 260° C. at 100 mm. Hg A., is provided and may be located anywhere along the length of the reactor, although it is preferably located at the feed end of the reactor. The water and organic fraction are removed from the reactor without their passing through the liquid mixture contained in any other reaction zone, and separated from the diol and COP acids by fractionating trays and a reflux condenser fitted to the esterification reactor.

The vacuum level and heating jacket temperature should be such as to provide vaporization from all stages at a temperature which will provide a high reaction rate. Generally, the temperature of the reaction zone ranges from about 200 to 300° C. and preferably from 250 to 275° C., while the pressure ranges from atmospheric to 50 mm. Hg A. and preferably from 100 to 200 mm. Hg A. A temperature gradient exists in the feed end stages of the reactor increasing to a relatively constant temperature for the rest of the reactor. Portions of either the alkanediol or the COP acids may be introduced at intermediate stages into the esterification reactor. Countercurrent contact of the feed and gas vapors is not desired in the process according to this invention.

The esterified product is withdrawn from the reactor at a rate providing the required residence time necessary to reduce the free acid content of the COP acids to a very low level, preferably less than 0.1 wt. percent. Generally, the time ranges from 2 to 6 hours and preferably from 3 to 4 hours. Product from the reactor comprises the diesters of the dicarboxylic acids in the COP acid mixture, excess alkanediol and very small amounts of free acid. When 1,6-hexanediol is used as the alkanediol the resulting esterified COP acids include the diester of adipic acid and 1,6-hexanediol.

The crude ester mixture as it comes from the reactor may be subjected to further treatment to remove any residual low boiling organic substances which act as catalyst deactivators. The treatment comprises subjecting the COP acid esters to an elevated temperature and reduced pressure sufficient to vaporize the organic fraction boiling between 150 and 250° C. at 10 mm. Hg A., without heating the product mixture to a skin temperature substantially above its bubble point. The temperature and pressure for this operation must be that necessary to remove any residual catalyst poisons as an overhead fraction without removing a substantial amount of the feed material. This is accomplished by techniques such as thin film stripping, using means such as falling film evaporators and wiped film exaporators, or by bubbling an inert gas through the heated product mixture. When a wiped film evaporator was used, for example, a skin temperature of 220 to 240° C. at a pressure of 1 mm. Hg A. was sufficient to remove the catalyst poisons along with about approximately 5% of the feed mixture. By stripping the esterified product coming from the reactor the subsequent hydrogenation rate was increased approximately 50% over that of the unstripped product. An increase in catalyst life by addition of less makeup catalyst or a decrease in hydrogenation reactor capacity results from the thin film stripping operation. Also the increase in hydrogenation rate enabled the hydrogenation to be carried out at a lower temperature resulting in higher 1,6-hexanediol yields.

The COP esters resulting from the above operation are mixed with a hydrogenation catalyst such as copper chromite, heated and introduced with hydrogen into a hydrogenolysis reactor.

A greatly improved catalyst life results as a process of this invention.

The following examples are given as illustrative of the invention only and are not intended to be limiting in any way.

Example I

A feed mixture including adipic acid, hydroxycaproic acid, succinic acid, glutaric acid, and formylvaleric acid was fed continuously along with a stoichiometric amount of 1,6-hexanediol to a concentrator operated at 152° C. and 100 mm. Hg A. Essentially all of the water in the feed mixture was removed and 90% of the acids were converted to esters in the concentrator. The concentrator residue containing about 10% acid and less than 1% water was fed continuously to a baffled esterification tube reactor operated at 260° C. and 100 mm. Hg A. The residence times in the concentrator and esterification reactor were 5 hours and 3 hours respectively based on the feed rates. The esterified product contained less than 0.1% free acid.

Example II

A COP acid mixture similar to that in Example I was continuously fed along with an excess of a diol mixture comprising substantially all 1,6-hexanediol and lesser amounts of 1,5-pentanediol and 1,4-butane-diol to a baffled concentrator operated at atmospheric pressure and at a temperature of 181° C. The bulk of the water in the feed mixture was removed along with a low boiling organic fraction found to act as a hydrogenation catalyst poison. The concentrator residue, having a crude 1,6-hexanediol to anhydrous COP weight ratio of 0.64, was continuously fed to a baffled esterification tube reactor operated at a pressure of 170 mm. Hg A. and a temperature ranging from 215° C. at the feed end to 255° C. at the product end. The residence times in the concentrator and esterification reactor were 6 hours and 3 and one half hours respectively. The esterified product contained less than 0.1% free acid and was suitable for subsequent processing by hydrogenation over a copper chromite catalyst with substantially no deactivation of the hydrogenation catalyst.

Example III

The COP acids obtained as a fraction from the liquid phase oxidation of cyclohexane with molecular oxygen and a cobalt-manganese catalyst containing a major amount of six carbon acids such as adipic acid was mixed with a 30% excess of 1,6-hexanediol and the mixture heated to reflux temperature (190° C.) at atmospheric pressure for approximately six and one half hours. The resulting partially esterified crude mixture was then fed into a horizontal stainless steel baffled reactor heated by circulating oil in an outer jacket. The reactor was maintained at a pressure of 175 mm. Hg A. and at a temperature ranging from 222° C. at the feed end to 264° C. at the product end. The residence time in the reactor was about three and one half hours. Volatile materials including water, small amounts of cyclohexanol and 1,6-hexanediol and other low boiling organic constituents were taken overhead at a location on the feed end of the reactor to a fractionating column where they were removed and the 1,6-hexanediol recycled to the reactor. The crude ester mixture (including the 1,6-hexanediol diester of adipic acid) as it left the reactor contained about 1% by weight of free acid (based on a molecular weight of 100). The COP ester mixture was then fed to a falling film evaporator operating at a pressure of about 20 mm. Hg A. and a temperature of 250° C. About 6% of the ester feed was removed as light ends during the flow through the falling film evaporator. The ester product mixture was then hydrogenated over a copper chromite catalyst. The resulting catalyst productivity improvement was 43% over that resulting from feeding the COP ester product directly from the esterification reactor to the hydrogenolysis reactor.

The embodiments of the invention in which an exclusive property or privilege is claimed are defined as follows:

1. In a process for producing at least one polyhydric alcohol member of the group consisting of 1,6-hexanediol, 1,5-pentanediol, and 1,4-butanediol by catalytically hydrogenating an ester of the corresponding precursor acid selected from the group consisting of adipic acid, hydroxycaproic acid, formylvaleric acid, glutaric acid, succinic acid, and mixtures thereof, the improvement which comprises preparing an ester feedstock for said hydrogenation by the following steps:

mixing with said precursor acid, in stoichiometric excess, at least one terminal alkanediol having from 4 to 8 carbon atoms to form a concentrator feed mixture;

heating said concentrator feed mixture to a reflux temperature while withdrawing therefrom a vapor comprising water and an organic fraction boiling below the boiling point of said terminal alkanediol, producing a concentrator product comprising predominantly said alkanediol, alkanediol esters of said precursor acid, and unesterified precursor acid;

passing said concentrator product through a series of staged heated reaction zones separated from one another by means for preventing backmixing of liquid between adjacent zones;

maintaining said series of reaction zones at a temperature ranging from about 200° C. to 300° C. and at a pressure ranging between about 50 mm. Hg A. and 760 mm. Hg A.;

continuously withdrawing from said series of reaction zones a vapor comprising water of reaction and an organic fraction boiling below the boiling point of said terminal alkanediol without allowing said vapor withdrawn from one reaction zone to pass through the liquid contained in any other zone;

and withdrawing from the last of said reaction zones an esterified product having a free acid composition less than about 0.3 weight percent, the retention time of the liquid in passage through the reaction zone being controlled at at least about 2 hours.

2. Process according to claim 1 wherein the alkanediol is 1,6-hexanediol, the polyhydric alcohol is also 1,6-hexanediol, and the precursor acid is a mixture comprising adipic acid and hydroxycaproic acid.

3. Process according to claim 1 wherein the reflux temperature ranges from 140 to 220° C.

4. Process according to claim 1 wherein there are at least 5 heated esterification reaction zones.

5. Process according to claim 1 wherein a temperature gradient increasing from the first zone to the last zone is maintained in the series of heated esterification reaction zones.

6. Process according to claim 1 wherein an additional amount of alkanediol or precursor acid is added to an intermediate stage among the series of staged reaction zones.

7. Process according to claim 1 wherein the esterified product is subjected to thin film stripping at a temperature sufficient to vaporize an organic fraction boiling between 150 and 250° C. at 10 mm. Hg A.

8. In a process for converting an acid feedstock comprising predominantly adipic acid and hydroxycaproic acid to 1,6-hexanediol by a method which comprises esterifying said acid feedstock followed by hydrogenating the resulting ester product over a copper chromite catalyst, the improvement which comprises:

mixing said acid feedstock with a 10% to 70% excess of 1,6-hexanediol;

heating the resulting mixture of acid feedstock and 1,6-hexanediol to a reflux temperature between about 140° C. and 220° C. at a pressure ranging between about 200 mm. Hg A. and atmospheric pressure while withdrawing a vapor comprising water and an organic fraction boiling below the boiling point of 1,6-hexanediol to form a partially esterified intermediate product;

passing said intermediate product through at least five heated, consecutive reaction zones which are partitioned from one another to prevent backmixing of the liquid passing through said zones;

maintaining said reaction zones at a temperature between about 200° C. and 300° C. and at a pressure ranging between about 50 mm. Hg A. and 760 mm. Hg A.;

continuously withdrawing from said reaction zones a vapor comprising water of reaction and an organic fraction boiling below the boiling point of 1,6-hexanediol, without passing that portion of said vapor withdrawn from a given reaction zone through the liquid contained in any other reaction zone; and withdrawing from the last reaction zone a liquid comprising adipic acid substantially completely esterified with 1,6-hexanediol, the withdrawal rate being so controlled as to provide a residence time of about 2 to 6 hours for the liquid passing through the reaction zones.

References Cited

UNITED STATES PATENTS 3,268,588  8/1966  Horlenko et al. _____ 260—635

FOREIGN PATENTS 800,847  9/1958  Great Britain.

LORRAINE A. WEINBERGER, *Primary Examiner.*

V. GARNER, *Assistant Examiner.*

U.S. Cl. X.R.

260—483, 484, 485